June 20, 1961
W. C. WILSON
2,988,825
DANCE INSTRUCTION METHOD AND TRAINING AID
Filed Aug. 24, 1959
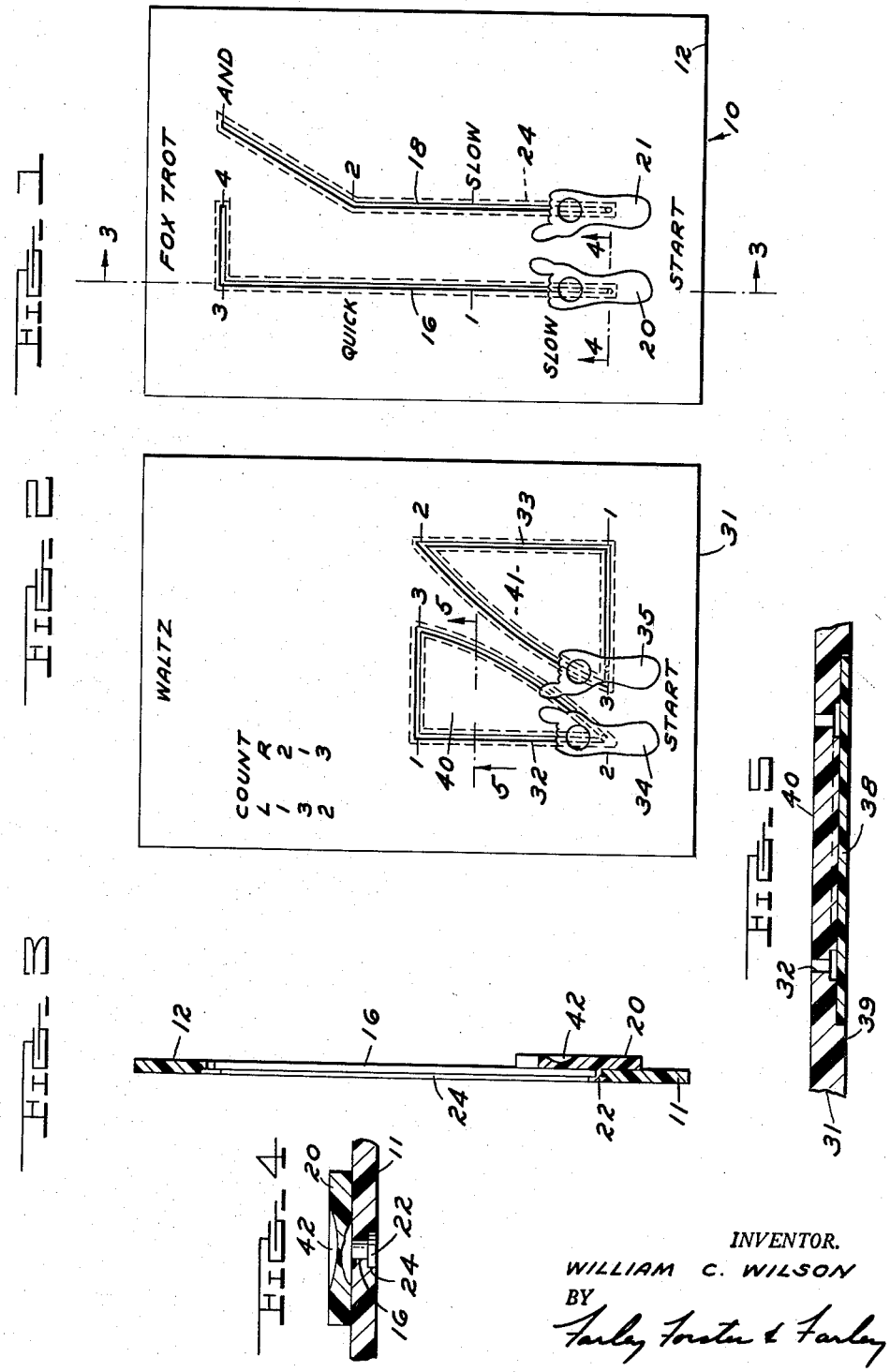
INVENTOR.
WILLIAM C. WILSON
BY
Farley Forster & Farley
ATTORNEYS

United States Patent Office 2,988,825
Patented June 20, 1961

2,988,825
DANCE INSTRUCTION METHOD AND
TRAINING AID
William C. Wilson, 241 Kenwood Court,
Grosse Pointe Farms 30, Mich.
Filed Aug. 24, 1959, Ser. No. 835,721
5 Claims. (Cl. 35—29)

This invention relates to a method for supplementing the usual course of dance instruction and to a dancing aid for use in conjunction therewith.

The present invention is based upon the discovery that the usual method of personally instructing a student in the foot movements of any dance step can be supplemented and the rate of learning accelerated when the student practices the pattern and rhythm of the foot movements with the hands. Charts have been proposed which show the foot movements visually but have little practical value in aiding the student in practicing away from the dance studio. However, when a chart showing the foot movements of a particular step is employed in conjunction with some means by which the student can employ the hands to trace the pattern and rhythm of these foot movements, I have found that the student can then easily translate these hand movements to foot movements.

In order to put this method of training into practice, I have developed a training aid which consists of a board or plate-like member having a chart printed thereon, this chart including, on a reduced scale, the pattern of movement for each of the feet for a particular dance step, together with suitable indicia showing the sequence of movements and the relative positions of the feet throughout the step. The pattern of movement of each foot is defined by a groove formed in the board and a pair of manually operable members are slidably mounted in the grooves. These members can be operated by the left and right hands and each moved in a path corresponding to the left and right foot.

This method of instruction is not intended to be a substitute for the usual course of personal instruction but merely as a supplement. Students will find these training aids helpful for practicing the steps they are learning. More experienced dancers will be able to pick up the basic foot movements of a new step from a training aid.

A presently preferred construction for such a training aid is illustrated in the accompanying drawing which consists of the following views:

FIGURE 1, a plan view of a training aid for the conventional foxtrot step;
FIGURE 2, a plan view of a similar training aid for the conventional waltz step;
FIGURE 3, a sectional elevation taken on the line 3—3 of FIGURE 1;
FIGURE 4, a sectional detail on an enlarged scale taken on the line 4—4 of FIGURE 1; and
FIGURE 5, an enlarged sectional detail on the line 5—5 of FIGURE 2.

Referring to FIGURE 1, the training aid generally designated 10 consists of a board or plate 11 (FIG. 3) having a chart printed on the upper surface 12 thereof as shown, the chart including a path of movement for the left foot, a path of movement for the right foot, and suitable legend indicating the sequence of movement. The path of movement of the left foot is defined by a slot 16 formed through the board and the path of movement for the right foot is defined by a similar slot 18. A pair of manually operable members 20 and 21 are mounted in the slots 16 and 18 respectively and each of these members is provided with a headed pin or projection 22 (FIGS. 4 and 5) which extends through the slot with the headed portion thereof engaging a groove 24 formed in the lower surface of the board 11 along the edges of the slots. Thus, the pins 22 secure the members 20 and 21 to the board for sliding and pivoting movement in their respective slots.

The training aid shown in FIG. 2 is very similar in construction and consists of a board or plate 31, a slot 32 formed in the pattern of movement of the left foot for the conventional waltz step, and a slot 33 for the pattern of movement of the right foot. A member 34 is secured to the board for sliding movement by the left hand in the slot 32 and a member 35 is slidably mounted in the slot 33 for movement by the right hand. The members 34 and 35 are mounted in the same way as has been described for the members 20 and 21. Due to the fact that the paths of movement 32 and 33 for each of the feet in the waltz step describe an endless or closed pattern, the board construction includes a plate 38 (FIG. 5) which is recessed into the bottom surface 39 of the board 31 to support the portions 40 and 41 within the paths of movement 32 and 33.

These training aids are made in a size for convenient handling and show the paths of foot movement on a much reduced scale. For example, the devices illustrated in FIGS. 1 and 2 are reproduced at approximately one-half actual size. For the convenience of the student, the manually operable members are preferably formed with a depression 42 in the upper surface thereof, as illustrated in FIGS. 3 and 4, this depression being engageable by a finger of the student's hand.

It will readily be appreciated that similar training aids can be designed for any dance step desired, the waltz and foxtrot steps being selected and shown herein for illustration only. These training aids operate very well when made of plastic material since this type of material is very smooth and offers little resistance to movement of the hand operated members.

While preferred embodiments have been described above in detail, it will be understood that numerous modifications might be resorted to without departing from the scope of the invention as defined in the following claims.

I claim:
1. A training aid device for learning the foot movements of a dance step comprising a plate, a pair of guideways formed therein in the paths of movement of the feet for such dance step, a pair of members directly operable with the left and right hands, means carried by each of said members for slidably engaging one of said guideways, and indicia on said plate for showing the relative positions and sequence of movements of said members along said guideways.

2. A training device for aiding a student in learning the foot movements of a dance step comprising a plate, a pair of manually operable members, means whereby said members may be moved on said plate with the left and right hands of a student in defined paths corresponding to those of the left foot and right foot respectively for such dance step and indicia on said plate for showing the relative positions and sequence of movements of said members.

3. A training device according to claim 2, further characterized by each of said members being provided with a depression for engagement by a finger of a student's hand.

4. A training device according to claim 2 wherein said means whereby said members may be moved in defined paths comprises a pair of slots formed in said plate, one slot for each of said paths, a groove formed around the bottom edges of each of said slots, and a headed pin carried by each of said members for securing such member to said plate for sliding and pivoting movement in one of said slots.

5. A training device according to claim 4 further characterized by said plate including a pair of plate-like members secured together in face-to-face relation with said slots being formed in one of said plate-like members.

References Cited in the file of this patent

UNITED STATES PATENTS

| | | |
|---|---|---|
| 233,482 | De Long | Oct. 19, 1880 |
| 2,207,190 | Carnahan | July 9, 1940 |
| 2,504,318 | Freeman | Apr. 18, 1950 |
| 2,837,837 | Castle | June 10, 1958 |
| 2,871,580 | Samdahl | Feb. 3, 1959 |

FOREIGN PATENTS

| | | |
|---|---|---|
| 379,870 | Germany | Aug. 30, 1923 |